US012239862B2

(12) United States Patent
Jensen et al.

(10) Patent No.: US 12,239,862 B2
(45) Date of Patent: Mar. 4, 2025

(54) VENTILATING FIRESTOP

(71) Applicant: SCUTI AS, Verdal (NO)

(72) Inventors: Geir Jensen, Trondheim (NO); Ruth Astrid Strøm, Ekne (NO)

(73) Assignee: SCUTI AS, Verdal (NO)

( * ) Notice: Subject to any disclaimer, the term of this patent is extended or adjusted under 35 U.S.C. 154(b) by 263 days.

(21) Appl. No.: 17/909,510

(22) PCT Filed: Mar. 24, 2021

(86) PCT No.: PCT/NO2021/050078
§ 371 (c)(1),
(2) Date: Sep. 6, 2022

(87) PCT Pub. No.: WO2021/194352
PCT Pub. Date: Sep. 30, 2021

(65) Prior Publication Data
US 2023/0116620 A1 Apr. 13, 2023

(30) Foreign Application Priority Data
Mar. 24, 2020 (NO) .................................... 20200349

(51) Int. Cl.
*A62C 2/06* (2006.01)

(52) U.S. Cl.
CPC .................................... *A62C 2/065* (2013.01)

(58) Field of Classification Search
CPC .................................. A62C 2/065; A62C 4/00
See application file for complete search history.

(56) References Cited

U.S. PATENT DOCUMENTS 5,351,448 A * 10/1994 Gohlke .................... H02G 3/22 52/220.8
2009/0260303 A1 10/2009 Jensen
(Continued)

FOREIGN PATENT DOCUMENTS

DE 10060252 A1 1/2002
GB 2107183 A 4/1983
(Continued)

OTHER PUBLICATIONS

PCT Notification of Transmittal of the International Preliminary Report on Patentability PCT/NO2021/050078, Date of mailing: May 17, 2022.

*Primary Examiner* — Patrick J Maestri
(74) *Attorney, Agent, or Firm* — Flener IP & Business Law; Zareefa B. Flener

(57) ABSTRACT

The invention relates to a ventilating firestop (10), comprising a load-bearing mesh (12) fitted with an intumescent (14), wherein the mesh (12) is malleable to a completely or partially confined volume (22), and the intumescent (14) applied to the mesh (12) forms a stripe pattern of intumescent spaced apart and with ventilating openings (30) between the stripes. At least the intumescent (14) in a plane which is exposed by fire forms a fine mesh and rapidly expandable stripe pattern which, during the fire attack phase, seals the openings (30) and forms a fire-insulating shield (40), and the intumescent (14) located separately from the shield (40), after formation of the shield (40), is expandable to subsequently fills up the remaining volume (22) in the firestop (10).

18 Claims, 6 Drawing Sheets

(56) References Cited

U.S. PATENT DOCUMENTS

| | | | | |
|---|---|---|---|---|
| 2010/0270040 | A1* | 10/2010 | Merchant | A62C 3/02<br>169/48 |
| 2013/0255893 | A1 | 10/2013 | Jochen et al. | |
| 2021/0146173 | A1* | 5/2021 | Förg | F16L 5/04 |

FOREIGN PATENT DOCUMENTS

| | | | |
|---|---|---|---|
| GB | 2331923 | A | 9/1999 |
| GB | 2475258 | A | 5/2011 |
| GB | 2482318 | A | 1/2012 |
| GB | 2533356 | A | 6/2016 |
| WO | 0162343 | A1 | 8/2001 |
| WO | 20180174720 | A1 | 9/2018 |

* cited by examiner

VENTILATING FIRESTOP

FIELD OF THE INVENTION

The present invention relates to a ventilating firestop, comprising a self-supporting mesh carrying and reinforcing intumescent material.

BACKGROUND OF THE INVENTION

Intumescent-based passive vents are simple and effective firestop products. When ordinary intumescent-based vents are to stop fire within 5 min, or also to stop radiation or smoke from fire, they must be replaced by other types of fire dampers that are expensive, large or by specially manufactured intumescent vents that require straight contact surfaces and are less flexible to movements and require accurate fitting.

Intumescent-based vents that are used for linear firestops in air cavities in facades, roof projections and roofs are prone to failure if the cladding or other construction parts bend or are consumed in a fire that create an opening for fire spread. The way that they are mounted is prone to error during fitting on site. Standard intumescent vents have a thick layer that takes a long time to close gaps of up to 50 mm. When the intumescent expands it can fall out. New requirements are to prevent large fires as a consequence of ordinary cavity vents failing. A requirement is that the products must retain firestopping performance even if the constructions move in fire or in wind and that they must stop fires that spread at speeds of around 3 m/min or pass a 100 mm high vent within 2 s.

DISCLOSURE OF PRIOR ART

US2013255893 A1 describes various forms for fire and smoke protection systems. The document describes a flexible fire protection which is rolled up on a roll and which is attached to a wall in front of an opening in a building. The flexible fire protection is in the form of a fire curtain which is rolled out to close the opening in the event of a fire. Furthermore, the flexible fire protection comprises a flexible woven material which is flame-resistant. The woven material has an interwoven fabric which provides improved resistance to the influence of external forces, such as from a powerful jet of water. The use of an intumescent is also mentioned, and it appears that the element is self-supporting. However, the solution is a closed construction that does not provide ventilation.

US7413024 B1 shows a self-closing and plate-shaped vent which has a surrounding frame with a honeycomb-shaped structure coated with an intumescent. When the vent is attached to a wall with an opening, the vent is normally open and allows flow of air through the opening. When exposed to heat from a fire, the intumescent material expands and closes the vent Further reference is given to WO2018174720 A, which corresponds to NO343232 B1, and which describes a ventilating fire filter in a building construction comprising a three-dimensional structure of wickerwork-shaped strings covered by an intumescent. The three-dimensional structure is in the form of a cut-out self-supporting, frame-free piece of the structure that can be cut and flexible. The frame-free pieces of structure are fitted by being adapted and pushed into place in a cavity gap and are self-locking under the influence of heat.

A common feature in known techniques is that fire insulation is not achieved until a volume is completely filled with an intumescent. Typical volumes are typically not filled until after 30 s and up to 5 min, depending on the size of the air opening. It requires extensive use of elements for quenching gap and heat sink to prevent fire from passing in the period.

Objects of the Present Invention

It is an object to provide a firestop device that is normally ventilating and that transforms into a full reactive firestop within a very short time when exposed to heat of fire.

A common solution in a first step is a fire gap element which stops flames before the air vent opening in a second stage is closed by an expanding intumescent which fills the entire vent and insulates the fire. With the invention it is possible to introduce extra steps between the two mentioned, and which quickly shall form a thin shell of the first heat stress in the fire to shorten the time within which, for example, the quenching gap element is required to perform.

The invention is further based on as much of the first heat as possible being absorbed in the intumescent material that forms shells. Heat that finds its way to another intumescent at the same time and thereby reduces heat uptake in the shell will delay the formation of the shell. This can happen if the intumescent for volume filling is close to that for the shell. Heat transfer by both flame radiation and convection shall not be lost to an "unnecessary" intumescent near the shell in the shell-forming phase, according to the invention.

A further object is to provide a firestop of a spring-loaded mesh and with intumescent stripes which rapidly expands and forms a fire-insulating shell against the fire, especially in the attacking phase of the fire.

The firestop can be used alone. Alternatively, it can have a quenching gap element for flame blocking in the open condition of the vent or a further intumescent for filling the dimensioned volume for a sufficiently long fire resistance time. A three-stage firestop can combine techniques where the typical step sequence is flame blocking, fire-insulating shells and a fire-insulating filled volume. Flame blocking in the open state and shell formation takes place in the attacking phase of the fire.

A firestop vent according to the invention can be frame free, open to being cut, malleable and which, at the site of use or in the factory, can be fitted in one or more layers in hollow spaces, slits, sheets, canals built in a box or a frame.

A firestop vent with a filling intumescent according to the invention can be designed to achieve a fixed expansion volume, self-locking by application of an expansion pocket, quenching gap, spark arrestor net, catch net for flammable droplets and, combined with a tight screen, it can stop flame radiation and smoke.

SUMMARY OF THE INVENTION

The invention relates to a solution for ventilating firestop elements, such as air transfer grilles with fire resistance for use in buildings, where they are normally ventilated by air and block in the event of fire. A ventilating firestop can thus also be called a completely ventilatable firestop or fire damper.

The invention is based on ventilating firestops with or without a quenching gap element, including an element of a self-supporting mesh applied with a semi-open intumescent pattern that forms a shell or a crust very quickly in fire heat. The shell-forming element is placed in the firestop so that it receives the heat as directly as possible. The intumescent pattern is fine meshed to provide a maximum surface area to take up the heat and provide a short distance so that an expanding intumescent mass from a thread in the pattern meets an expanding intumescent mass from the nearest thread early. The pattern is hereinafter also referred to as a stripe pattern. Pattern stripes may be angled arbitrary, cross each other or be in parallel to each other. The stripe pattern is attached to a reinforcing self-supporting mesh, typically of metal, made as a quenching gap element where it is required. An intumescent-based or other reactive or ablative materials that are used in the invention can, for example, be based on graphite, sodium silicate or ammonium phosphate and be characterised in that they expand at exposure to heat. Heat exposure will typically be 130-180° C., but high temperature activation can alternatively occur later, for example, from 300° C. upwards.

The ventilating firestop according to the invention is preferably dimensioned so that a large and good contact surface between flames and an endothermic intumescent helps to prevent flame passage while the ventilating firestop is open, especially by extending the duration of the "quenching gap" effect when quenching gap element are used up to the time intumescent material has expanded and sealed the firestop element. For example, one layer of quenching gap mesh can replace several quenching gap elements.

With quenching gap mesh that can be used in the invention is meant a mesh with openings smaller than a specific quenching gap for the combustible gas fire in intended use will be nourished.

With self-supporting and able to be cut is meant that the ventilating firestop does not need to be fitted in any kind of frame or the like, and that the size can be adapted to the actual ventilation opening by cutting and/or cutting out to the desired dimension.

A ventilating and yielding firestop according to the invention which, for example, is cut out of a plate will be self-supporting, i.e., it can be used as it is without a bracing or a frame to hold the intumescent material and can be attached by pressing or clamping in place by hand and/or by using clamps, screws, pins, glue, gaskets, etc. in openings. Furthermore, the yielding mesh will be able to follow the shape and/or movement of the structure and thus contribute to a more efficient firestop.

A firestop according to the invention can be bent double or in several layers to achieve extended fire resistance time. Cut out flat firestops can be folded and adapted in layers fitted in entire building elements or in frames at the factory and can take up, for example, linear or rectangular shapes.

The above-mentioned objects are achieved with a ventilating firestop comprising a self-supporting mesh equipped with an intumescent, where the mesh is malleable to a fully or partially limited volume, and intumescent applied to the mesh forms a stripe pattern of intumescent mutually spaced apart and ventilating openings between the stripes. At least one intumescent in a plane which is influenced by fire comprises a fine meshed and a rapidly expandable stripe pattern which, during the attack phase of the fire, seal the mesh openings and form a fire-insulating shield between the stripes, and intumescent located separately from the shield, after formation of the shield, is expandable for subsequently filling up the remaining volume in the firestop.

Tests show that with a shield according to the invention, full fire insulation within 5 s against a typical 35 s for conventional vents is obtained in the same opening.

The fine meshed stripes of intumescent readily have a surface and short mutual distance which, under the influence of heat, are enough for the stripes to quickly become expanded towards each other during the attacking phase of the fire for the formation of the shield.

An intumescent located inside or outside the shield can form a coarse grid that slowly expands and fills the volume, giving fire insulation for extended time of fire resistance.

Furthermore, the mesh can be formed as a flame-stopping mesh with mesh-openings of rectangular shape closing gaps.

Said intumescent can in a first embodiment be applied to the mesh in a stripe pattern of parallel intumescent stripes. Alternatively, the intumescent can in a second embodiment be applied to the mesh in a check pattern of intumescent stripes.

Said intumescent can be added on to the mesh as a stripe pattern carried out completely or partially in the form of close and evenly distributed dots or raised pegs or in the form of threads distributed in an air volume adjacent to the mesh.

Mesh can be provided in a sheet form with longitudinal side edges where one or both of the longitudinally running side edges comprises a reinforcing flange.

Likewise, mesh can be produced in a sheet form or is cut into a sheet form with longitudinal side edges, where one or more side edges are folded to, or mounted on, a mounting flange.

Mounting flanges on said side edges can be arranged for locking engagement with each other.

In one variant, the mesh can have longitudinally running side edges where a first side edge is formed with a S-shape and a second side edge is formed into a half ball shape, as the half ball shape is arranged in a locking arrangement by the insertion under the S-shape when this is fastened to a base.

The mesh can be a malleable and spring-loaded mesh produced with spring wires for the formation of a spring-loaded effect.

Furthermore, the malleable and spring-loaded mesh can be produced with braided steel wires equipped with transverse spring wires for the formation of a spring-loaded effect.

The malleable and spring-loaded mesh can also be produced with knitting steel wires equipped with transverse spring wires for the formation of a spring-loaded effect.

The transverse spring wires can be arranged mutually spaced apart in the longitudinal direction of the mesh which is larger than a quenching gap and smaller than the maximum mesh size to prevent wastage of the expanded intumescent.

Furthermore, the firestop can be comprising an expansion pocket, the expansion pocket comprises an expandable intumescent interposed between several meshes, which pocket under expansion unfolds and become pressed against surrounding structure and edges.

One or more of said spring wires and/or steel wires can be coated with an intumescent and be connected to a power source, said wires are arranged to be activated as heating wire(s).

In one embodiment, said intumescent stripes may be powder/electrode lacquered with metal, or have nano-fibred surfaces.

Furthermore, said stripes of an intumescent can be extruded, glued or sprayed onto the mesh in parallel or in transverse with ventilating mesh openings between, in one or more layers.

Said pattern of an intumescent can be attached with seams to the mesh, such as a seam of sacrificial-based polyester or cotton.

The firestop can be cut or folded to comprise several mesh layers with inlaid, intermediate intumescent stripes between respective mesh layers with quenching gap.

DESCRIPTION OF FIGURES

Preferred embodiments of the invention shall, in the following, be described in more detail with reference to the enclosed figures, in which:

FIG. 2 shows the ventilating firestop shown in FIG. 1 fitted in an opening or a cavity in a building construction or the like.

FIG. 4 shows the ventilating firestop shown in FIG. 3 fitted in an opening or a cavity in a building construction or the like.

FIG. 9 shows the ventilating firestop shown in FIG. 8 fitted in an opening or a cavity in a building construction or the like.

DESCRIPTION OF PREFERRED EMBODIMENTS OF THE INVENTION

Figure 1:
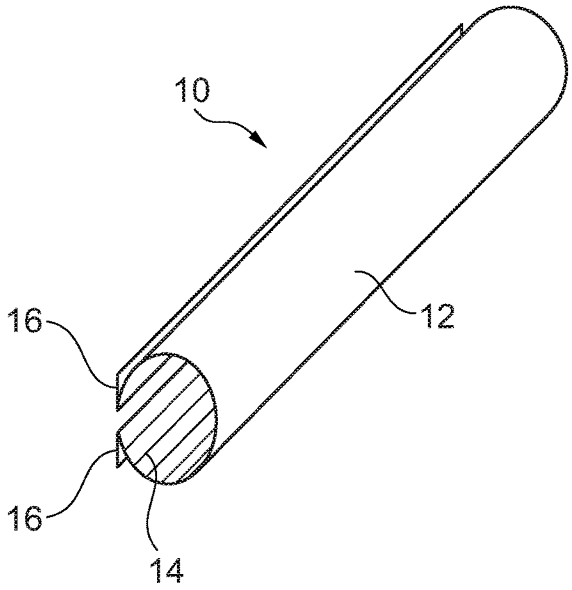
FIG. 1 shows a ventilating firestop according to the invention.
Figure 2:
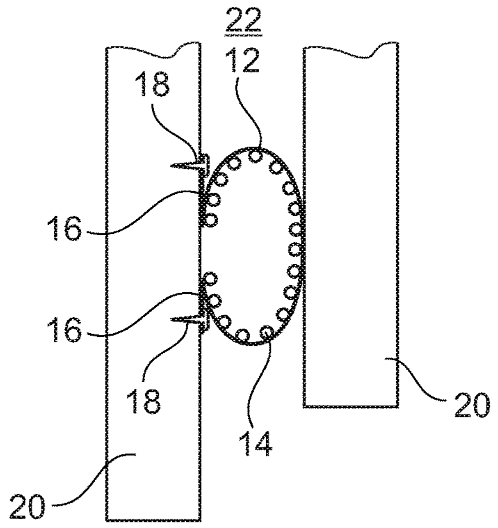
Figure 3:
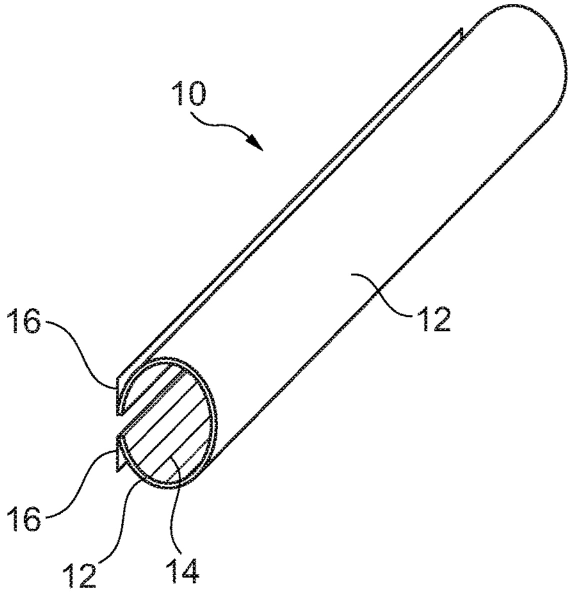
FIG. 3 shows a variant of a ventilating firestop according to the invention.
Figure 4:
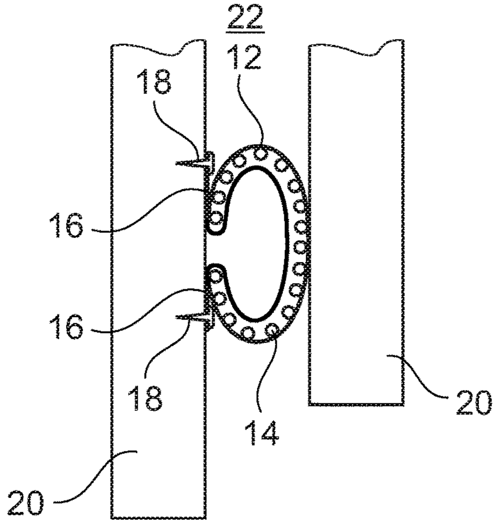

As can be seen from the figures, in an embodiment example, the present invention comprises a ventilating firestop which preferably comprises a malleable and spring-loaded mesh 12 with a fine mesh stripe pattern 14 of an intumescent which forms an insulating shell in the earliest phase of fire. The mesh 12 also includes stripes or bands of an intumescent for subsequent volume filling and fire insolation. The mesh 12 can be bent or rolled into a completely or approximate tubular shape so that an inner volume 22 is formed. The tube form can be circular, square or other shapes.

The firestop according to the invention can be made with a mesh 12 without a quenching gap. However, the term "quenching gap mesh" is generally used in the description in connection with the figures, while the more generic term "mesh" is generally used in the patent claims. An intumescent 14 can be applied to the mesh 12 in the same way whether the mesh has a quenching gap or not.

The quenching gap mesh 12, when this is used, has a mesh size which gives quenching gap, for example, a mesh size of between 0.8 and 8 mm. The mesh size, i.e., the size of the openings 30 between the wires in the quenching gap net, must be less than or equal to the maximum size of the quenching gap in the particular application as determined by the gas mixture which is developed by the fire, in order to quench.

A pattern of thin stripes, dots, pins or wires 14 of an intumescent can be applied to the mesh 12 and which can have a large surface area and a short mutual distance between them with open meshes or openings 30 between them in the plane in which the fire first strikes. Said intumescent can in a first embodiment be applied to the mesh in a stripe pattern of parallel intumescent stripes. Alternatively, the intumescent can in a second embodiment be applied to the mesh in a check pattern of intumescent stripes. In FIGS. 2, 4, 5, 6, 7 and 9 the intended fire direction is upwards, and the fire is thus first noted in the lower part of the firestop 10. The effect which the fire applies is described in more detail in connection with FIG. 15.

To produce a spring-loaded effect in the quenching gap, mesh 12, the quenching gap mesh 12 can be made of braided or knitted spring threads 28, or the quenching gap mesh 12 can be made of braided or knitted steel threads 34 equipped with preferably spring threads 28 running in the transverse direction. The spring threads 28 can have a size of, for example, 1 mm. The steel wires 34 can also be yielding.

The transverse spring wires 28 are usually arranged at a distance apart in the longitudinal direction of the quenching gap mesh 12 and with a mesh size which is larger than the quenching gap and smaller than maximum meshes in order to prevent a loss of expanded intumescent. With maximum meshes is meant here the size of openings/meshes in which an expanded intumescent will be pushed through and fall down. The mesh size can vary with the type of intumescent.

Figure 10:
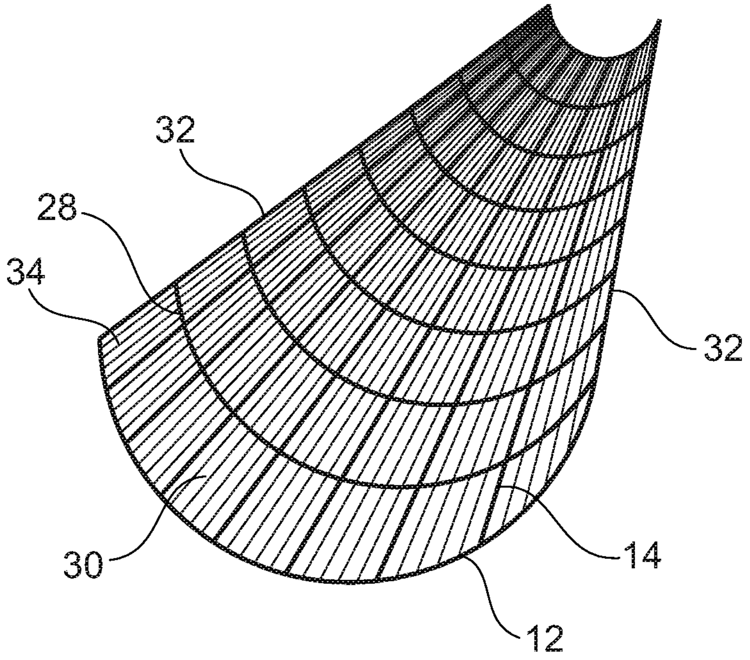
FIG. 10 shows in more detail a ventilating firestop according to the invention.
Figure 11:
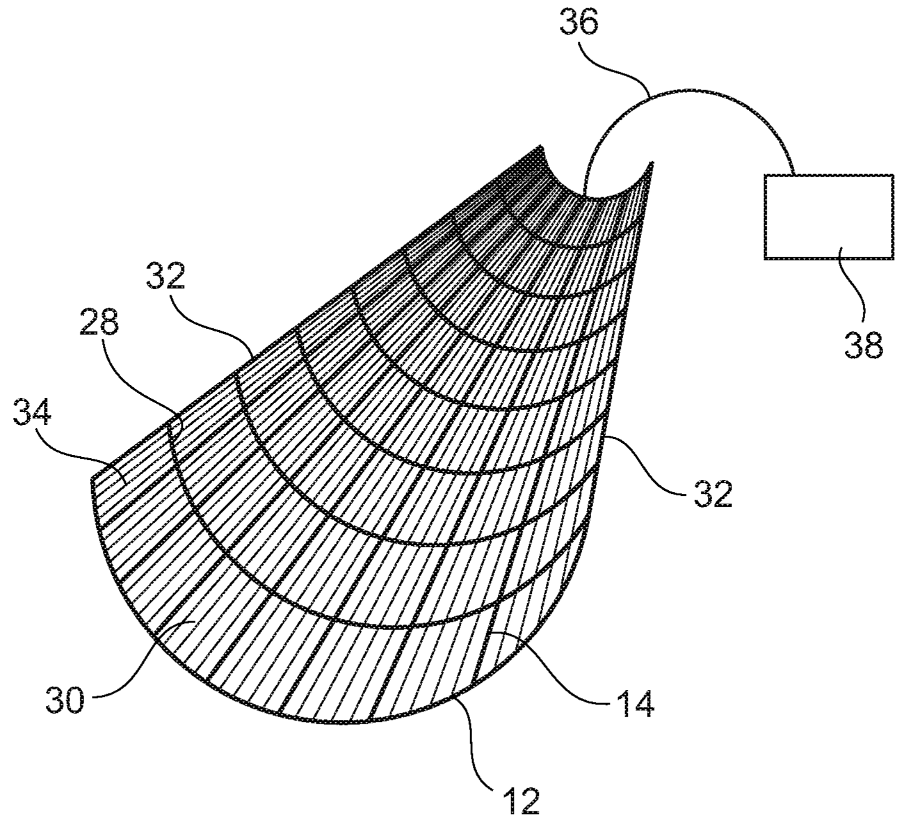
FIG. 11 shows a variant of the ventilating firestop according to the invention and which is fitted with heating wire.

FIGS. 10 and 11 show a specific embodiment of the quenching gap mesh 12 as discussed above, while the remaining figures show the quenching gap mesh illustratively.

In FIG. 11, one or more of the wires 28 or 34 are covered by the intumescent 14 and are connected via a wire 36 to a power source 38. On the activation of the power source 38, the wire(s) are heated up and said intumescent 14 will expand.

The quenching gap meshl 2 is initially intended to be produced in a flat form, but which can be bent into an approximately semicircular shape or into a tubular shape with a spring effect to withstand compression and at the same time react with protrusions or depressions on the surface where it is mounted. FIGS. 10 and 11 show, by way of example, that the transverse spring wires 28 substantially produce the spring effect while the longitudinal wires 34 are thinner and/or less rigid to provide a mesh which fills uneven surfaces.

The quenching gap mesh 12 can be produced in a sheet form with longitudinal side edges 32, where one or both longitudinal side edges 32 comprises a mounting flange 16. This can be done, either the quenching gap mesh 12 is produced in a sheet form or is cut into a sheet form, in that one or more of the side edges 32 are folded to, or mounted on, a mounting flange 16.

Figure 5:
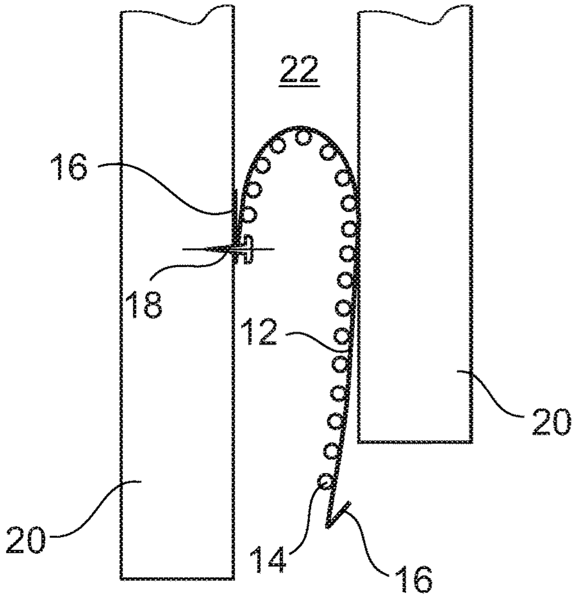
FIG. 5 shows an example of the ventilating firestop during fitting.
Figure 6:
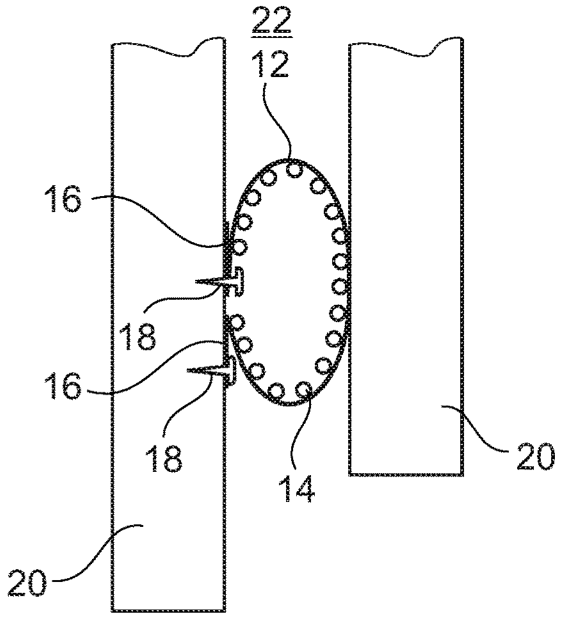
FIG. 6 shows the ventilating firestop after fitting.

The mounting flange 16 can be used to fasten the firestop 10 in a cavity 22 between two building parts 20 by means of a screw, pin 18 or similar fastening means. The mounting flanges 16 can also be glued to the surface. FIG. 5 shows such a fitting, where firstly the one mounting flange 16 on a first side edge 32 is attached to the base 20 by means of a screw or pin 18, and in FIG. 6 wherein also the second mounting flange 16 on the second side edge 32 is attached to the base 20 by means of the screw or pin 18.

Figure 7:
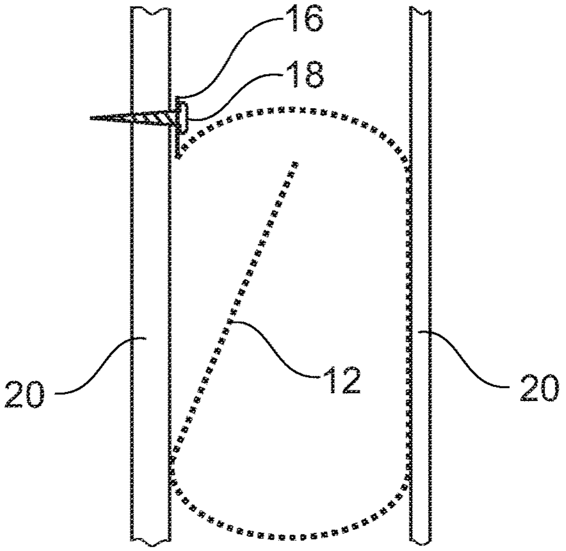
FIG. 7 shows illustratively a ventilating firestop attached to only one side edge.

FIG. 7 shows an example of a variant which is not formed into a closed tubular shape, and which is only attached to one side edge so that the other part is "free" to move.

Mounting flanges 16 on the side edges 32 of the quenching gap mesh 12 can also be arranged to have a locking integration with each other.

Figure 8:
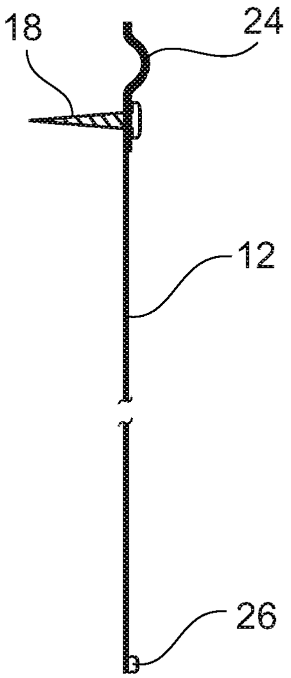
FIG. 8 shows a further variant of a ventilating firestop according to the invention.
Figure 9:
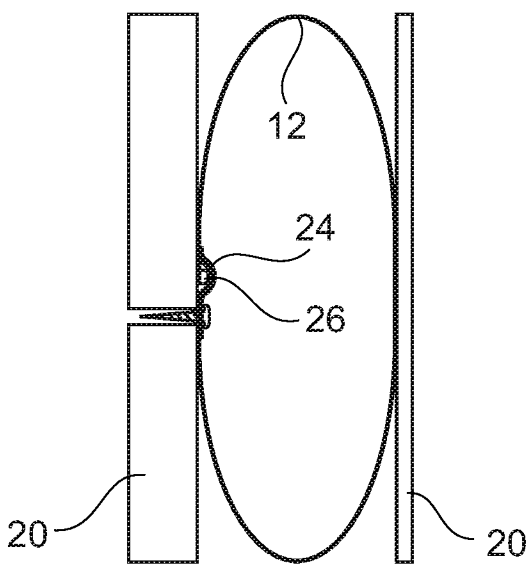

FIGS. 8 and 9 show an alternative embodiment of a ventilating firestop in which the quenching gap mesh 12 correspondingly has longitudinally running side edges 32, but where a first side edge is formed with an S-shape 24 and a second side edge is formed with a half ball shape 26. The half ball shape 26 can enter into a locking engagement by the insertion under the S-shape 24 when it is attached to the surface 20, as shown in FIG. 9.

Figure 12:
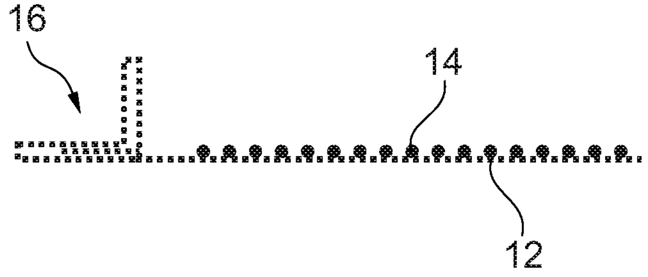
FIGS. 12 and 13 show illustratively variants of mounting flanges to the mesh.
Figure 13:
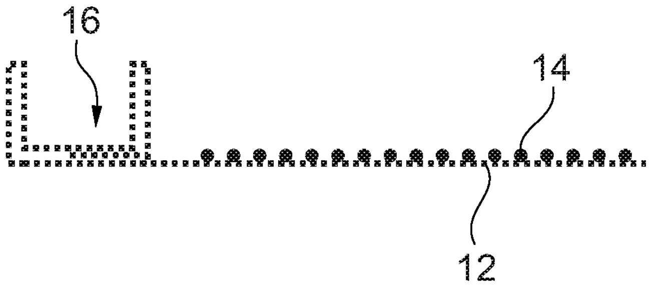

The FIGS. 12 and 13 further show variants of the mounting flange 16, where one or two vertical edges/folds can be folded by a folding and flange machine standing, for example, at right angles to the mesh. This makes the mounting flange 16 rigid enough to secure the quenching gap mesh 12 to hard or soft surfaces, such as wood or rock wool.

Figure 14:
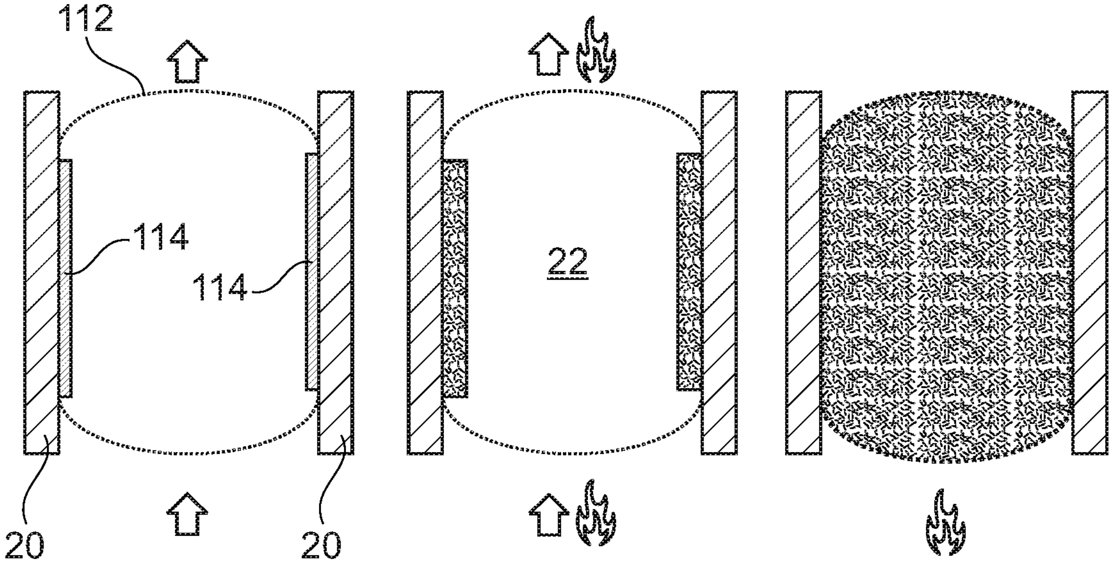
FIG. 14 shows an example of a firestop according to the prior art under the influence of heat from fire.
Figure 15:
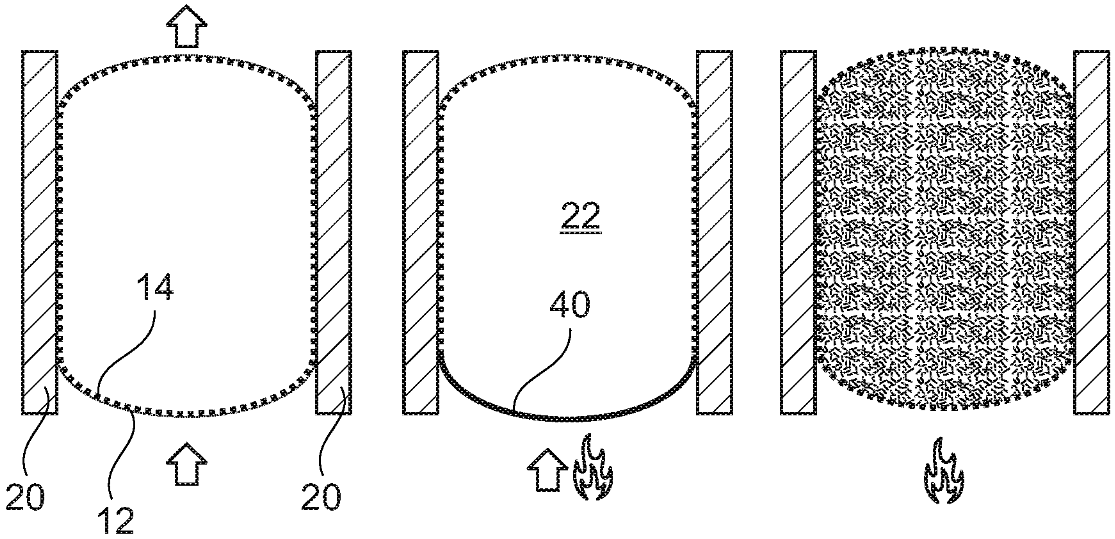
FIG. 15 shows an example of a ventilating firestop which forms a shell according to the invention under the influence of heat from fire in the earliest phase.

Locking of the side edges 32 of the firestop 10 results in a fixed expansion volume 22 (as shown in FIGS. 14 and 15). The fixed expansion volume being similar to said cavity 22 between two building parts 20.

FIGS. 14 and 15 show the difference between prior art and the invention, performed in a three-step function.

FIG. 14 shows an example of prior art where an intumescent 114 is placed in a mesh structure 112 between two building parts 20 to maximize air passage and such that the intumescent 114 can fill the entire void between the intumescent and opposite sides when all the intumescent is expanded in heat and in that it blocks against the fire (the figure to the right).

According to the invention as shown in FIG. 15, an intumescent 14 is placed in several thin stripes which forms a fine mesh stripe pattern, in at least one plane transverse to the air direction facing the actual fire load and so closed that ventilation is good enough. In that the stripes expand towards each other in heat, a shield or shell barrier 40 is formed which quickly closes the vent completely in the first minutes of the attack phase (as shown in the figure in the middle). After that, sustained heat from the fire will activate the rest of the intumescent in the vent to give a lasting volume sealing during the full filling phase (as shown in the figure to the right). This other intumescent can also be fine meshed, but preferably coarse meshed and with wider stripes or bands. The intumescent for the formation of the shield and volume filling are separated from each other.

The invention also works if the direction of the fire is opposite to that shown in FIG. 15.

Thus, a firestop 10 according to the invention can be comprising many fine stripes 14 of an intumescent rather than conventional thick stripes and gratings and in that the stripes are coated directly on the quenching gap mesh 12 with optimized ventilation distances in between. The heat of the flame and the large contact surface with an intumescent make the stripes expand very quickly to a closed shield 40 which blocks flames for many minutes. In the exposure phase, the heat activates an endothermic chemical process (heat consuming) in the intumescent material that takes heat from the fire gas/flames, and in that there is such a large area of intumescent surface concentrated at the outermost mesh layer that meets the flames, the process will further effectively extend the quenching gap effect such that several layers of quenching gap mesh can be avoided (several layers required in prior art).

In the next phase of the fire resistance time, more intumescent 14 expands downstream from said shield 40, but slowly due to the heat shield to the shield 40, and it is beneficial for building up an even and compact volume of an expanded intumescent.

At the same time, it is a preferred application of the invention that it is rolled 360 degrees and into a tubular shape where the long sides are attached to each other. The effect of this is that expansion will always take place in a given volume 22, either the environment forms the filter into an oval, into a flattened shape or into a square shape inside a suitable frame or otherwise. Because there are sealed stripes 14 with fine intumescent threads, also in the next layer the fire must pass, robust reliability is achieved. A fixed expansion volume further enables the use of an optimal amount of intumescent to ensure the longest possible fire resistance time, at the same time as any falling out of intumescent is virtually impossible. Intumescent that falls out/down leaves openings for fire and is known as one of the two biggest weaknesses with conventional solutions, where the passage of flames in the early phase is the other.

As an additional guarantee for rapid reaction also against smoke passage, the wires can be extruded with heating element wire before coating on the quenching gap mesh 12, as shown in FIG. 11. A short and adapted electrical current passage will cause the intumescent to expand and seal in a few seconds, while there is still only a little smoke in the room with the fire. Activation can happen from a smoke detector or manually, and a relatively small battery can be used.

As a further improvement of rapid expansion and less dust collection, metal powder/electrode-lacquered intumescent stripes (current) or "nano hair" coatings with high heat transfer performance can be used.

The firestop 10 can further be comprising an expansion pocket, for example, where the expansion pocket comprises an expandable intumescent interposed between several quenching gap meshes 12.

Figure 16:
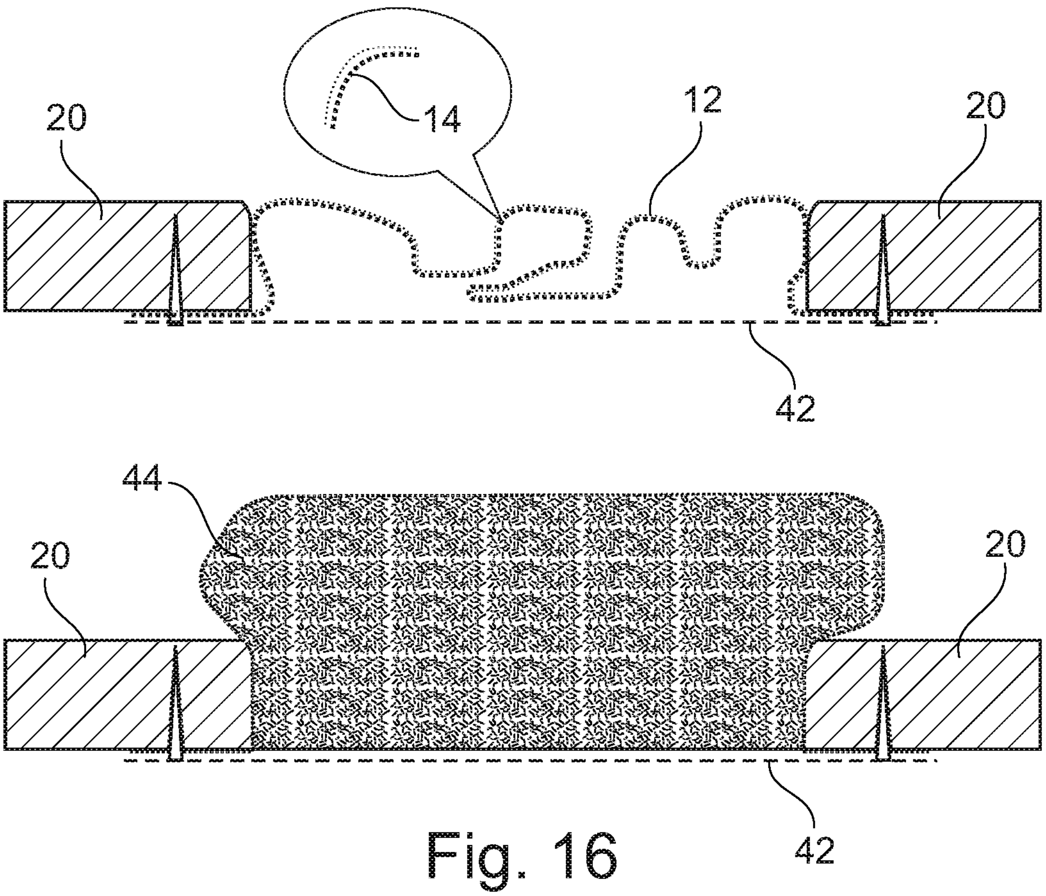
FIG. 16 shows a variant of the invention where the ventilating firestop functions as an expanding pocket.

As shown in FIG. 16, a quenching gap mesh 12 with an intumescent stripe pattern 14 can be placed in the opening in a building structure as a strip or the like and attached as explained above. In addition, an externally perforated cover 42 can be used.

The expansion pocket 44 contributes to that the firestop 10, under the influence of fire heat, can fill not only the ventilating empty space 22 in which it stands, but also fill in the expansion which can result from the building parts 20 bending in the fire and increasing the void space. The expansion pocket "inflates" with "limited space" for expansion. Whether the building parts are slightly compressed or give outwards, the expansion pocket will contribute to the firestop closing tightly against them when it is "inflated". The expansion pocket can be in a mesh and will normally be ventilating, but not letting through an intumescent which is activated to expand in fire. Parts of the expansion pocket can be held together by threads or the like fastened between parts of the expansion pocket's mesh, where the threads can be sacrificed.

FIG. 16 shows that a ventilating expansion pocket can attach itself to a single fire sheet when it expands. Even if it is attached only from the outside, it can neither push itself out of the opening outwards nor inwards when it expands. It does not have a gasket as in ordinary vents between the frame and sheet and is mounted quickly.

A firestop according to the invention can be produced in that an intumescent is applied in stripes 14 by extrusion.

The stripe pattern 14 of an intumescent can alternatively be glued or sprayed on the quenching gap mesh 12 in parallel or transversely with the ventilating mesh openings 30 in between, in one or more layers. This also applies to extrusion.

Furthermore, said stripes 14 of an intumescent can be fastened with seams to the quenching gap mesh 12, such as seams of sacrificial-based polyester or cotton.

A firestop according to the invention can also be produced with several quenching gap meshes 12 with inlaid, intermediate intumescent stripes 14 between respective quenching gap meshes 12.

In use, the flat-produced firestops can be folded or rolled into one or more short rollers which are fitted together with, for example, two or more continuous steel wires which are cut and bent at the ends. This then constitutes an element for use in an air transfer grille, eaves vent, outer wall vent etc., where an intumescent will not glide over time. Transverse locks are secured without a throughgoing connection in the direction of fire spread and vents will be packed tightly and accurately and not bulge out in the middle.

An example of optimal application in an air gap can be a 2 mm quenching gap mesh, but this is primarily needed only at the bottom where the fire hits. Other mesh can be in a spring thread of a coarser mesh, e.g., 12 mm. 12 mm is enough to hold most of the intumescent in place, but can push a suitably small amount through which seals against the connections.

Figure 17:
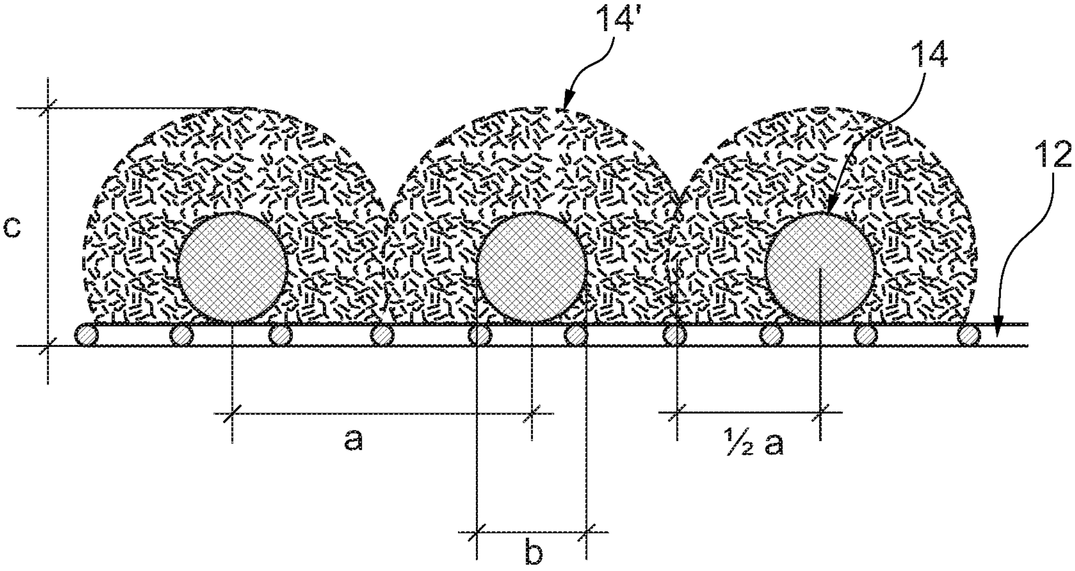
FIG. 17 shows in cross section how wires of an intumescent are placed on the mesh and expand towards each other.

FIG. 17 shows in more detail a cross-section of intumescent threads 14 at a distance a apart and with a diameter b in a fine meshed intumescent pattern on the load-bearing mesh 12. In the event of a fire, as shown, an expanding intumescent mass 14' meets between two wires 14 when the expanded thickness, for example, is ½ a for the formation of the shield 40. In a preferred embodiment, but not limited to, a can be larger than 2*b* and less than 5*b*, when the wire diameter b is 1-5 mm.

The load-bearing mesh can be in metal, glass fiber or other poorly combustible material with a preferred wire diameter of 0.1-1 mm but not limited to this.

Nearly finished expanding intumescent mass 14' is shown in dashed lines. An early-activated fire shield 40, including a load-bearing mesh 12, achieves at least thickness c. Shell thickness c can vary according to how long it shall insulate. A preferred thickness is 10-30 mm without listed articles. With listed articles in the form of a fixed quenching gap mesh, the thickness c can be less than 10 mm. In tests of fire shells according to the invention, a fire insulation time of 3-10 minutes has been achieved, but the shell according to the invention can be dimensioned to function for a longer time period. Additional fire insulation time can be achieved with the last step where more expanded intumescent fills the entire firestop.

In a practical embodiment, the fine mesh stripe pattern which forms the shield 40 and which expands rapidly can be very thin stripes, for example 2×2 mm, and be a short distance from each other and in all have a very large surface area per unit mass.

The remaining stripes of intumescent mesh that fill the volume 22 can be more arbitrary and coarsely meshed, and in typical applications, bands of, for example, 35×3 mm in cross-section and with distances of 20-50 mm from each other can be used. Alternatively, the stripes for volume filling can also be fine meshed.

The invention claimed is:

1. A ventilating firestop, comprising a self-supporting wire mesh equipped with an intumescent, wherein the wire mesh is malleable and is formed into a completely or partially confined volume, wherein said wire mesh is a flame-stopping mesh with a mesh size that provides quenching gap, and the wire mesh comprises first and second intumescent forming a pattern of stripes of intumescent with spacing and ventilating openings between the stripes, wherein the pattern of stripes of the first intumescent has a finer mesh size than the pattern of stripes of the second intumescent, said first intumescent is located on a fire influenceable plane of the wire mesh and has a rapidly expandable pattern of stripes of intumescent which, during a fire attack phase, expands towards each other to close said ventilating openings and form a fire-insulating shield, and said second intumescent is located on the wire mesh separate from the first intumescent, and has a pattern of stripes expandable slower than the stripes of the stripe pattern of first intumescent which, after formation of the fire-insulating shield, is expandable to subsequently fill up a remaining volume of the firestop.

2. The ventilating firestop according to claim 1, wherein the finely meshed stripes of intumescent have a surface and a mutual distance which, under the influence of heat, is sufficient for the stripes to rapidly expand towards each other during the fire attack phase for the formation of the fire-insulating shield.

3. The ventilating firestop according to claim 1, wherein said intumescent is applied to the mesh in a stripe pattern of parallel intumescent stripes.

4. The ventilating firestop according to claim 1, wherein said intumescent is applied to the mesh in a grid pattern of intumescent stripes.

5. The ventilating firestop according to claim 1, wherein said intumescent is applied to the mesh as a stripe pattern made wholly or partly in the form of closed and evenly distributed dots or upright pins or in the form of wires distributed in an air volume up to the mesh.

6. The ventilating firestop according to claim 1, wherein the mesh is produced in sheet form with longitudinal side edges, where one or both of the longitudinal side edges comprises a mounting flange.

7. The ventilating firestop according to claim 1, wherein the mesh is produced in a sheet form or is cut into a sheet form with longitudinal side edges, and that one or more side edges are folded to, or fitted onto, a mounting flange.

8. The ventilating firestop according to claim 6, wherein the mounting flanges on said side edges are arranged for locking engagement with each other.

9. The ventilating firestop according to claim 1, wherein the mesh comprises longitudinally running side edges, where a first side edge is formed with an S-shape and a second side edge is formed with a hemispherical shape, the hemispherical shaped side edge is arranged for locking engagement by insertion under the S-shaped side edge when the side edges are attached to a base.

10. The ventilating firestop according to claim 1, wherein the mesh is a malleable and spring-loaded mesh comprising spring wires providing a spring-loaded effect.

11. The ventilating firestop according to claim 10, wherein said malleable and spring-loaded mesh is produced with braided steel wires equipped with transverse-running spring wires for the formation of the spring-loaded effect.

12. The ventilating firestop according to claim 10, wherein said malleable and spring-loaded mesh is produced with knitted steel wires equipped with transverse-running spring wires for the formation of the spring-loaded effect.

13. The ventilating firestop according to claim 1, wherein transverse-running spring wires are arranged at a mutual distance apart in a longitudinally running direction of the mesh, which is larger than the quenching gap and smaller than a maximum mesh size to prevent fall out of expanded intumescent.

14. The ventilating firestop according to claim 1, wherein said firestop comprises an expansion pocket, said expansion pocket comprises an expandable intumescent interposed between several meshes.

15. The ventilating firestop according to claim 1, wherein one or more spring wires and/or steel wires are covered with an intumescent and are connected to a power source, with said wires arranged as heating wire(s) to activate the intumescent.

16. The ventilating firestop according to claim 1, wherein said intumescent is powder/electrode lacquered with metal or is coated by nano-fiber surfaces.

17. The ventilating firestop according to claim 1, wherein said intumescent is extruded, glued, brushed or sprayed onto the mesh in parallel or in intersections with ventilating mesh openings between, in one or more layers.

18. The ventilating firestop according to claim 1, wherein said firestop comprises several meshes with inlaid, intermediate intumescent stripes between respective meshes with quenching gap.

* * * * *